United States Patent
Takahashi et al.

(10) Patent No.: US 11,321,858 B2
(45) Date of Patent: May 3, 2022

(54) DISTANCE IMAGE GENERATION DEVICE WHICH CORRECTS DISTANCE MEASUREMENT ABNORMALITIES

(71) Applicant: FANUC CORPORATION, Yamanashi (JP)

(72) Inventors: Yuuki Takahashi, Yamanashi (JP); Atsushi Watanabe, Yamanashi (JP); Minoru Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/881,457

(22) Filed: May 22, 2020

(65) Prior Publication Data

US 2020/0380707 A1 Dec. 3, 2020

(30) Foreign Application Priority Data

May 30, 2019 (JP) .............................. JP2019-101602

(51) Int. Cl.
  *G06T 7/50* (2017.01)
  *G06T 7/68* (2017.01)
  *G06T 5/00* (2006.01)
  *G06T 5/50* (2006.01)

(52) U.S. Cl.
  CPC ................ *G06T 7/50* (2017.01); *G06T 5/006* (2013.01); *G06T 5/50* (2013.01); *G06T 7/68* (2017.01); *G06T 2207/10028* (2013.01)

(58) Field of Classification Search
  CPC .... G06T 7/50; G06T 7/68; G06T 5/50; G06T 5/006; G06T 2207/10028
  See application file for complete search history.

(56) References Cited

U.S. PATENT DOCUMENTS

| | | | |
|---|---|---|---|
| 2012/0262553 A1* | 10/2012 | Chen | H04N 13/111 348/47 |
| 2016/0161611 A1* | 6/2016 | Ito | G01S 17/86 356/51 |
| 2018/0168440 A1* | 6/2018 | Das | G06T 7/50 |
| 2019/0391266 A1* | 12/2019 | Mori | G02B 7/32 |

FOREIGN PATENT DOCUMENTS

| | | |
|---|---|---|
| JP | 2014178186 A | 9/2014 |
| JP | 2017181291 A | 10/2017 |
| JP | 201863157 A | 4/2018 |
| JP | 2018063157 A * | 4/2018 |

* cited by examiner

*Primary Examiner* — Clifford Hilaire
*Assistant Examiner* — Tyler B Edwards
(74) *Attorney, Agent, or Firm* — Hauptman Ham, LLP (57) ABSTRACT

A distance image generation device includes a light projection unit for projecting reference light onto a subject, a light reception unit having a plurality of two-dimensionally arrayed pixels, an optical system for guiding light from the subject to the light reception unit, an influence calculation means for calculating, based on an amount of light received by a target pixel and peripheral pixels thereof among the plurality of pixels, an influence of optical phenomena on the target pixel and the peripheral pixels, an impact calculation means for calculating the impact exerted by the peripheral pixels on the target pixel based on the influence, and a distance image generation means for generating a distance image of the subject based on the impact.

6 Claims, 10 Drawing Sheets

DISTANCE IMAGE GENERATION DEVICE WHICH CORRECTS DISTANCE MEASUREMENT ABNORMALITIES

BACKGROUND OF THE INVENTION

1. Field of the Invention

The present invention relates to a distance image generation device, and in particular, relates to a distance image generation device which corrects distance measurement abnormalities.

2. Description of the Related Art

TOF (time of flight) cameras which output a distance based on the time of flight of light as distance measuring devices for measuring the distance to an object are known. Many TOF cameras use a phase difference method in which a target space is irradiated with reference light which is intensity-modulated over predetermined cycles, and a distance measurement value of the target space is output based on the phase difference between the reference light and the light reflected by the object in the target space. The phase difference is determined from the amount of reflected light received.

In such TOF cameras, distance measurement abnormalities may occur due to various optical phenomena in the camera interior (the lens, the silicon layer of the image sensor, etc.). For example, when a highly-reflective material such as a white material or a retroreflective material is photographed, the distance measurement value may be distorted up to a pixel surrounding the pixel which should receive the light due to light scattered within the camera. Such distance measurement abnormalities are not limited to highly-reflective materials, but can also be caused by optical phenomena such as flaring or ghosting, which may occur when the lens is pointed at strong light sources, for example, the sun. Furthermore, the measurement values of the peripheral pixels may be abnormal due to the influence of aberrations, which is a lens characteristic.

Figure 10A:
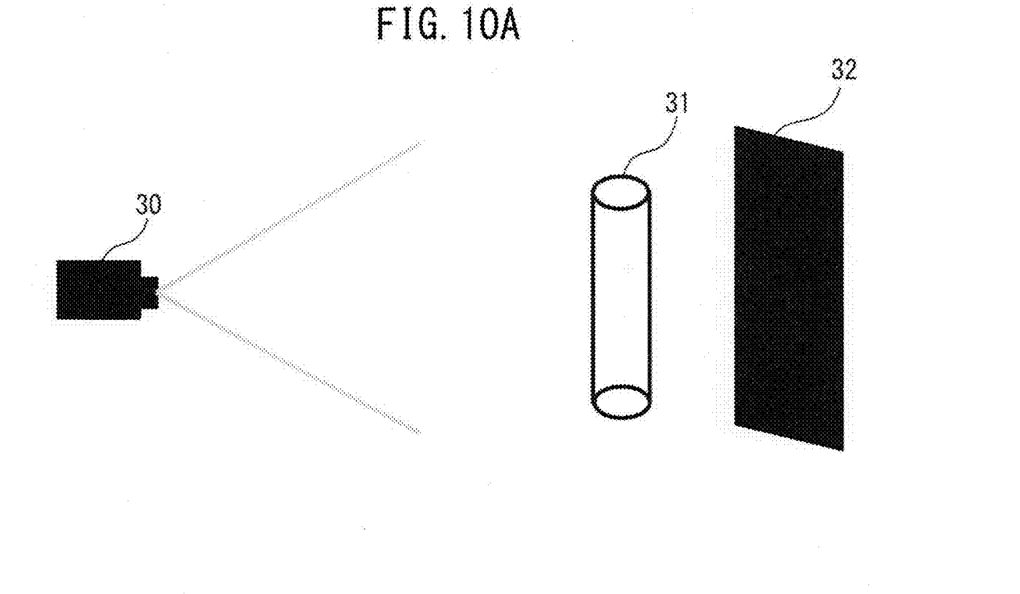
FIG. 10A is view showing an example of a distance measurement abnormality caused by a highly-reflective material.
Figure 10B:
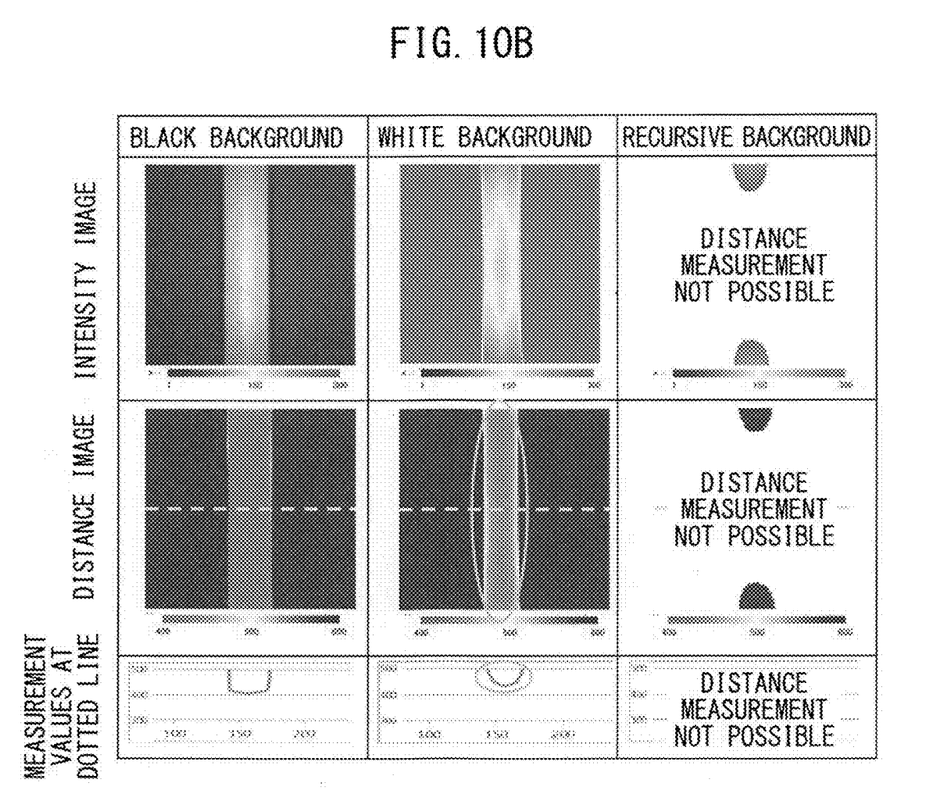
FIG. 10B is a view showing an example of a distance measurement abnormality caused by a highly-reflectively material.

FIGS. 10A and 10B show examples of distance measurement abnormalities caused by highly-reflective materials. FIG. 10A shows the case in which a cylindrical member 31 and three different backgrounds 32 (black background, white background, and recursive background) are captured, and FIG. 10B shows intensity images and distance images generated by the TOF camera 30, and the distance measurement values thereof. Though the measurement value of the cylindrical member 31 is not substantially influenced in the case of a black background, in the case of a white background, which is a highly-reflective material, a distance measurement abnormality 33 occurs at the boundary region between the cylindrical member 31 and the white background. In the case of the recursive background, so-called saturation occurred, whereby distance measurement was not possible.

Figure 11A:
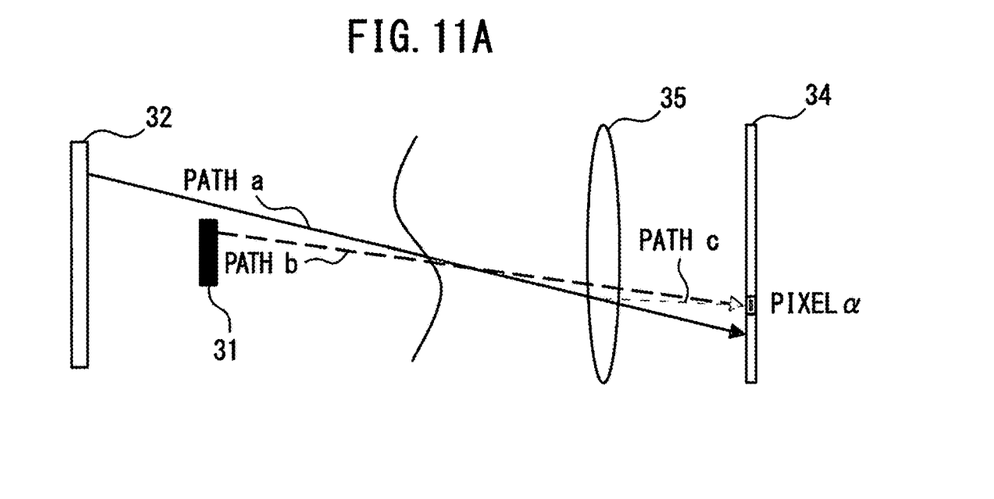
FIG. 11A is a view showing a distance measurement abnormality principle.
Figure 11B:
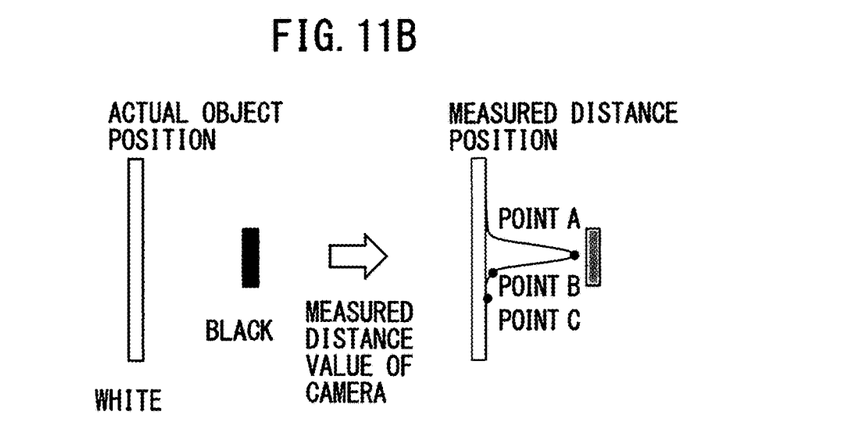
FIG. 11B is a view showing a distance measurement abnormality principle.
Figure 11C:
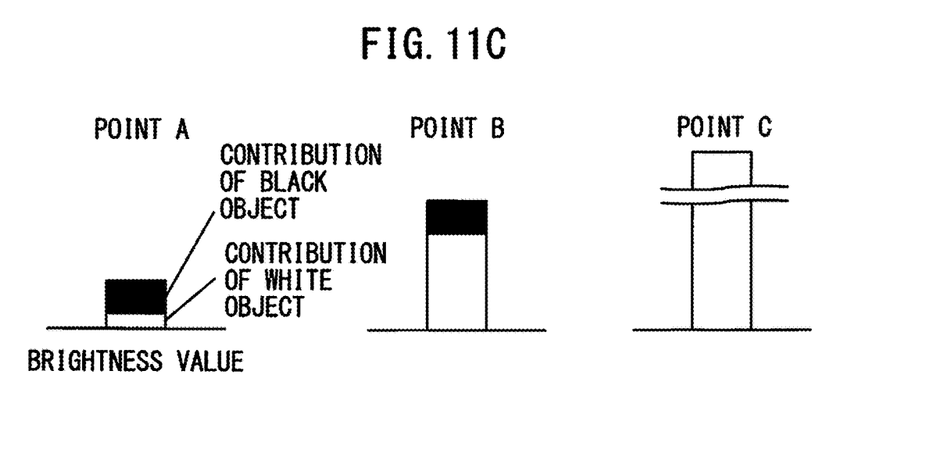
FIG. 11C is a view showing a distance measurement abnormality principle.

The principle behind this type of distance measurement abnormality is shown in FIGS. 11A to 11C. As shown in FIG. 11A, though pixel a of the image sensor 34 should receive light only from path b, light from the path a may be received inside the camera (the lens 35, the silicon layer of the image sensor 34, etc.). Though the problem of optical phenomena such as stray light and aberrations is an unavoidable problem, in the world of image recognition, the presence of such phenomena is rarely problematic since images can be judged only by the brightness thereof.

However, in the world of TOF cameras, since the time of flight of light is measured, if the amount of light received by pixel a is determined by combining path b and path a, the luminance ratio between path b constituting pixel a and path a becomes a problem. When the luminance of path a is large and the luminance of path b is low, the measurement value calculated by pixel a represents the distance of path a rather than the distance of path b. FIGS. 11B and 11C show the luminance values of the contribution from the black object and the contribution from the white object, for example, at the distance measurement positions of points A, B, and C. As a prior art for solving the problem of the distance measurement abnormality caused by such optical phenomena, the following literature is known.

Japanese Unexamined Patent Publication (Kokai) No. 2018-063157 describes a shape measurement device which comprises a light projection unit and a light reception unit and which generates distance image data based on received light, wherein a determination formula including a degree of coincidence between height data corresponding to a target pixel and height data corresponding to peripheral pixels and the maximum amount of light received by the peripheral pixels is set, it is determined whether the height data corresponding to the target pixel has been generated based on the stray light based on the value obtained by the determination formula, and the height data is corrected based on the result of the stray light determination.

Japanese Unexamined Patent Publication (Kokai) No. 2014-178186 describes a system using a TOF camera which comprises a light projection unit and a light reception unit and which generates a distance image based on received light, detects an object in a detection area, and outputs an alarm (safety signal), wherein an image processing unit acquires a received light image and a distance image, calculates whether raindrop pixels, in which a raindrop is reflected, are present from the linear function of amount of light received and distance, determines raindrop-influenced pixels, and determines whether an object is noise from the number of raindrop pixels in the generated raindrop influence image.

Japanese Unexamined Patent Publication (Kokai) No. 2017-181291 describes a distance measurement device which comprises a light projection unit and a light receiving unit and which generates a distance image based on detected light, wherein a region group is extracted by grouping small regions having distances in two-dimensional coordinates in an input image (distance image) which are close and distance values which are largely different from each other, and it is determined whether noise is caused by the influence of sunlight.

SUMMARY OF THE INVENTION

In light of the conventional problems, a technology which can simply and accurately correct distance measurement abnormalities caused by various optical phenomena such as stray light and aberrations has been demanded.

An aspect of the present disclosure provides a distance image generation device comprising a light projection unit for projecting reference light onto a subject, a light reception unit having a plurality of two-dimensionally arrayed pixels, an optical system for guiding light from the subject to the light reception unit, an influence calculation means for calculating, based on an amount of light received by a target pixel and a peripheral pixel thereof among the plurality of pixels, an influence of optical phenomena on the target pixel and the peripheral pixel, an impact calculation means for calculating the impact exerted by the peripheral pixel on the target pixel based on the influence, and a distance image generation means for generating a distance image of the subject based on the impact.

DETAILED DESCRIPTION

The embodiments of the present disclosure will be described in detail below referring to the attached drawings. In the drawings, identical or similar constituent elements are assigned the same or similar reference signs. Furthermore, the embodiments described below do not limit the technical scope of the invention and the definitions of the terms described in the claims.

Figure 1:
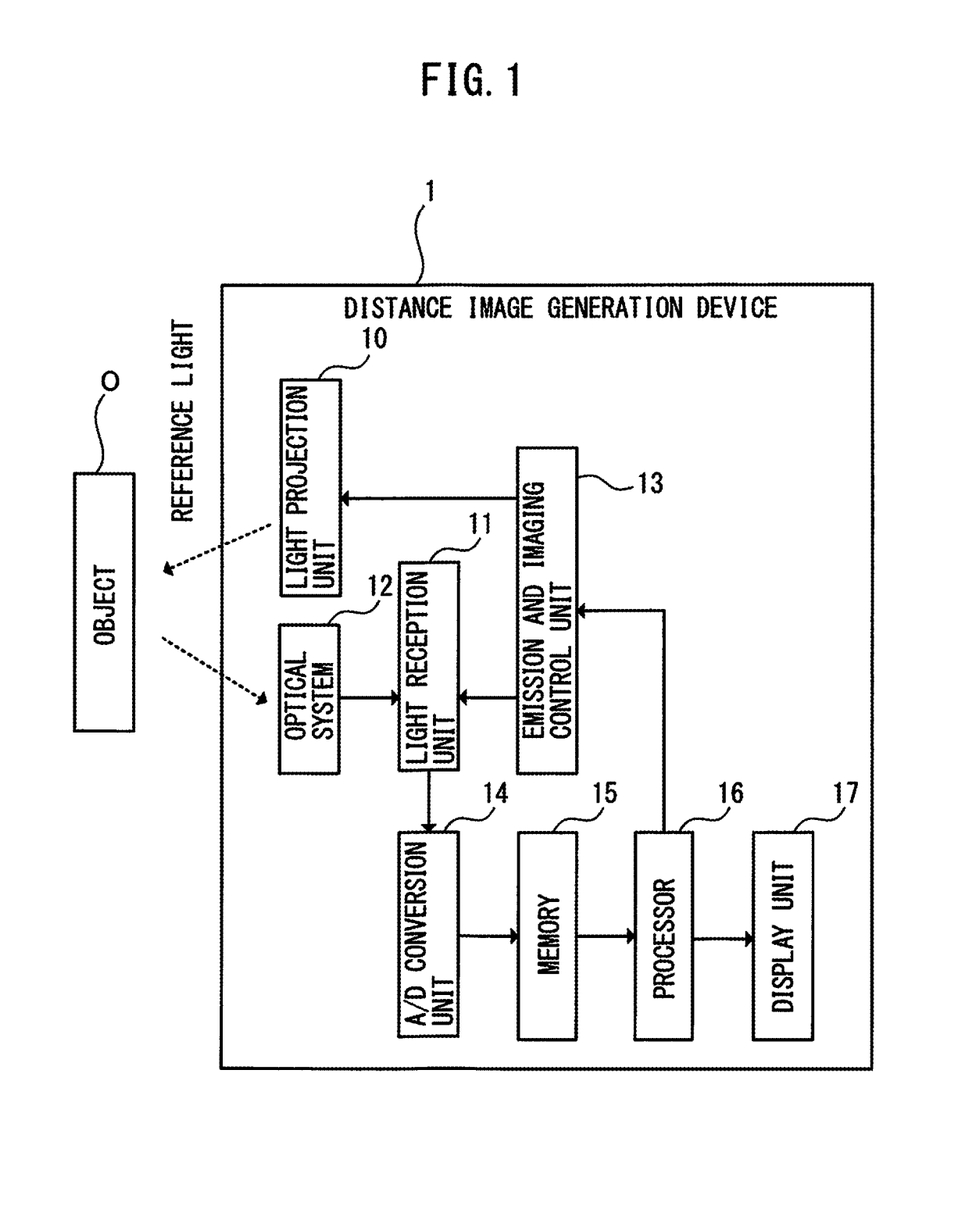
FIG. 1 is a block diagram of a distance image generation device according to an embodiment.

FIG. 1 shows the structure of a distance image generation device 1 according to the present embodiment. The distance image generation device 1 comprises a light projection unit 10, a light reception unit 11, an optical system 12, an emission and imaging control unit 13, an A/D conversion unit 14, a memory 15, and a processor 16. The distance image generation device 1 may further comprise a display unit 17.

The light projection unit 10 comprises a light source (e.g., a light-emitting diode, semiconductor laser, etc.) which emits intensity-modulated reference light, and a diffuser which scatters the emitted reference light toward the subject O, and the light projection unit 10 projects the reference light onto the subject O. The light reception unit 11 comprises an image sensor (e.g., a CCD (charge-coupled device), CMOS (complementary metal-oxide semiconductor), etc.) having a plurality of two-dimensionally arrayed pixels.

The optical system 12 comprises a condenser lens which condenses the light from the subject O, and an optical filter which allows the wavelength band of the reference light to pass therethrough, and the optical system 12 guides the light from the subject O to the light reception unit 11. The emission and imaging control unit 13 comprises a control circuit which controls the light emission of the light projection unit 10 and the capturing of the light reception unit 11, and the emission and imaging control unit 13 is controlled by the processor 16. The A/D conversion unit 14 comprises an A/D converter which A/D converts the amount of light received by the light reception unit 11.

The memory 15 comprises a memory (e.g., a semiconductor memory, magnetic storage device, etc.) which stores various information. The processor 16 comprises a processor (e.g., a semiconductor integrated circuit such as a CPU (central processing unit) or FPGA (field-programmable gate array)) which controls the entirety of the distance image generation device 1. The display unit 17 comprises a display device (e.g., a liquid crystal display, organic EL display, etc.) which displays various information.

Figure 2:
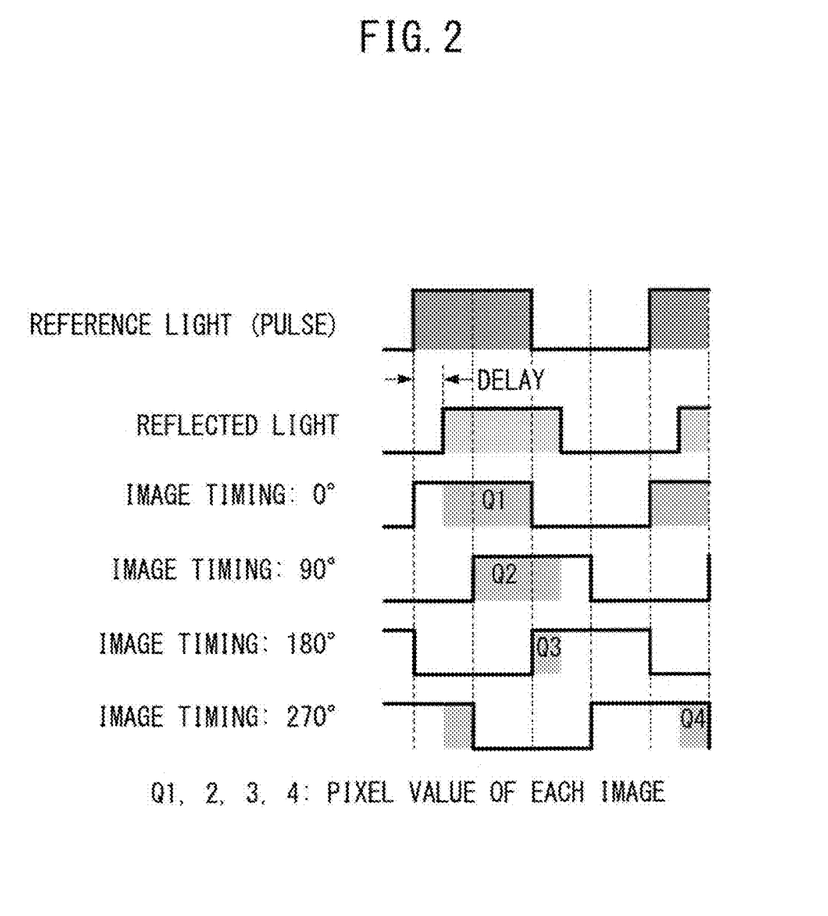
FIG. 2 is a view showing a distance measurement value calculation method according to the embodiment.

FIG. 2 shows a measurement value calculation method according to the present embodiment. The light reception unit 11 repeatedly captures images at a plurality of image timings, for example, four image timings (0°, 90°, 180°, and 270°), having phases different than the reference light, and acquires amounts of light received $Q_1$, $Q_2$, $Q_3$, and $Q_4$ for each pixel. The measurement value L of each pixel is determined from, for example, the formula below. In the formula below, c is the speed of light and f is the modulation frequency of the reference light.

[Formula 1]

$$L = \frac{c}{4\pi f} \cdot \tan^{-1}\left(\frac{Q_2 - Q_4}{Q_1 - Q_3}\right) \qquad 1$$

Figure 3:
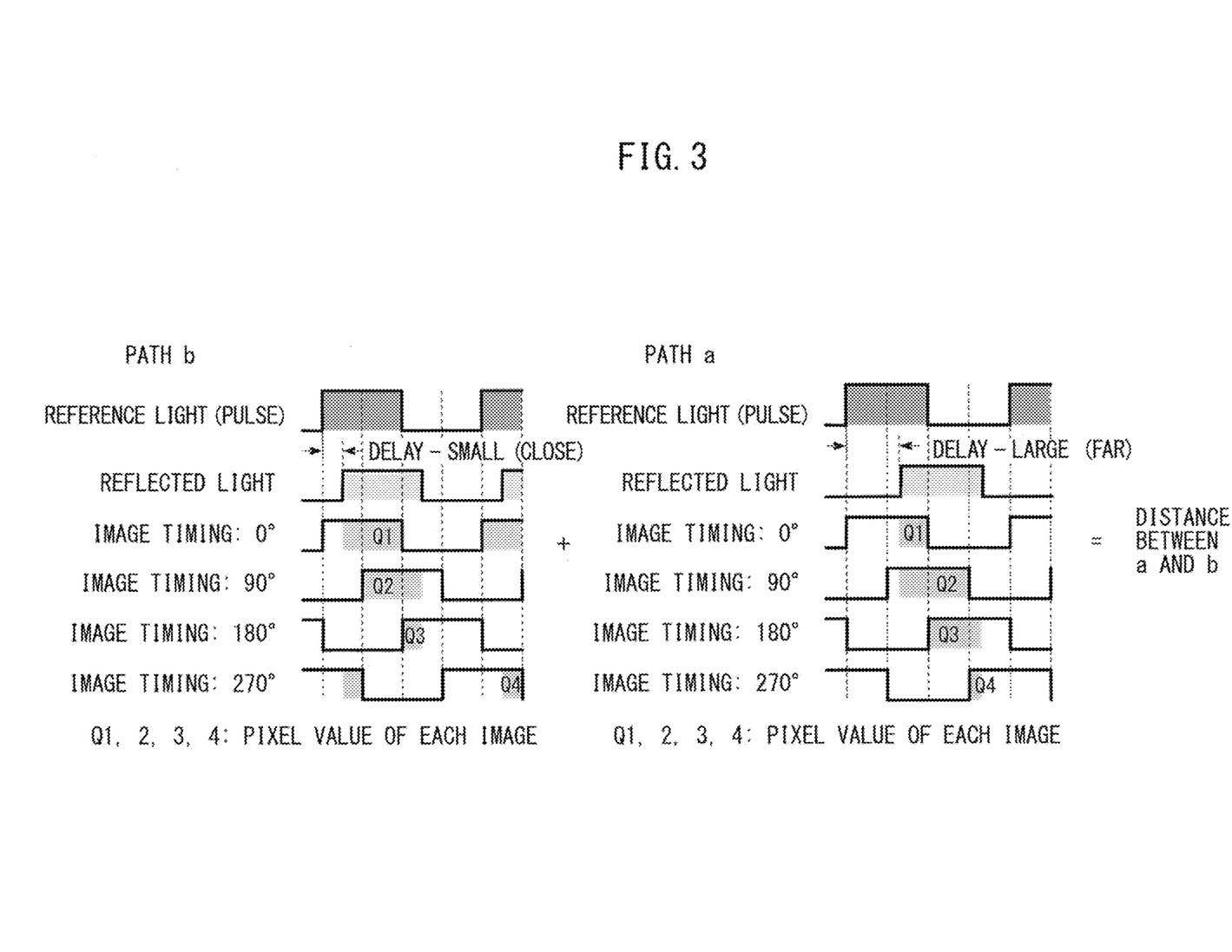
FIG. 3 is a view showing a distance measurement abnormality caused by stray light.

FIG. 3 shows a distance measurement abnormality caused by stray light. As shown in FIG. 11A, though pixel a of the image sensor 34 should originally receive the light from path b, light from path a may be received inside the device (lens, image sensor, etc.). Since the amounts of light received Q1, Q2, Q3, and Q4 of path b and path a are different from each other, the measurement value L calculated with the above formula may become the distance between path a and path b. In order to eliminate the influence of path a, it is necessary to subtract the influence from path a on pixel a from the amount of light received by pixel a.

Figure 4:
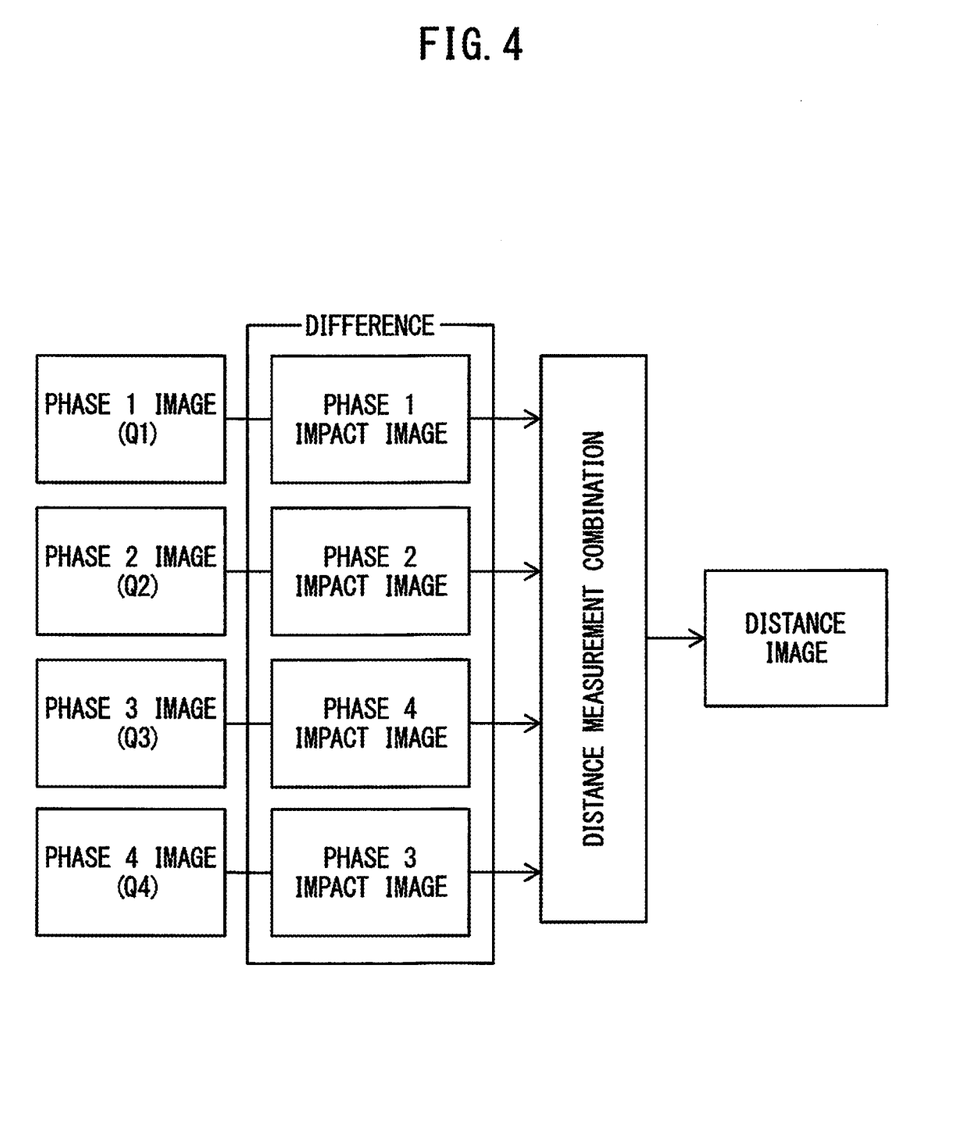
FIG. 4 is a view showing a distance image generation method according to an embodiment.

FIG. 4 shows a distance image generation method according to the present embodiment. Since the calculation of the measurement value is performed by generating phase images (phase 1 image to phase 4 image) captured at a plurality of image timings having phases different from the reference light, in each phase image, it is necessary to eliminate the influence of optical phenomena. Though it is considered that the influence of path a on each phase image cannot be determined unless the measurement value of path a is known, since the influence of optical phenomena such as stray light and aberrations appears as blur in an image, the influence of path a on each phase image can be determined by calculating the influence of optical phenomena based on the actual amounts of light received by a target pixel and peripheral pixels thereof, and calculating an impact exerted on the target pixel by the peripheral pixels based on the influence. In other words, impact images (phase 1 impact image to phase 4 impact image) are generated for each phase image, and by subtracting the impact images from each phase image, it is possible to specify only the amount of light received from path b. In other words, it is possible to simply and accurately correct distance measurement abnormalities caused by various optical phenomena.

The influence Fi of optical phenomena at each pixel can be described by, for example, the formula below. In the formula below, A is the amount of light received at the individual pixel, $C_1$ is an influence coefficient, and $C_2$ is a correction coefficient corresponding to individual characteristics (lens characteristics, sensor characteristics, etc.) inside the device.

[Formula 2]

$$Fi = C_1 A + C_2 \qquad 2$$

Figure 5:
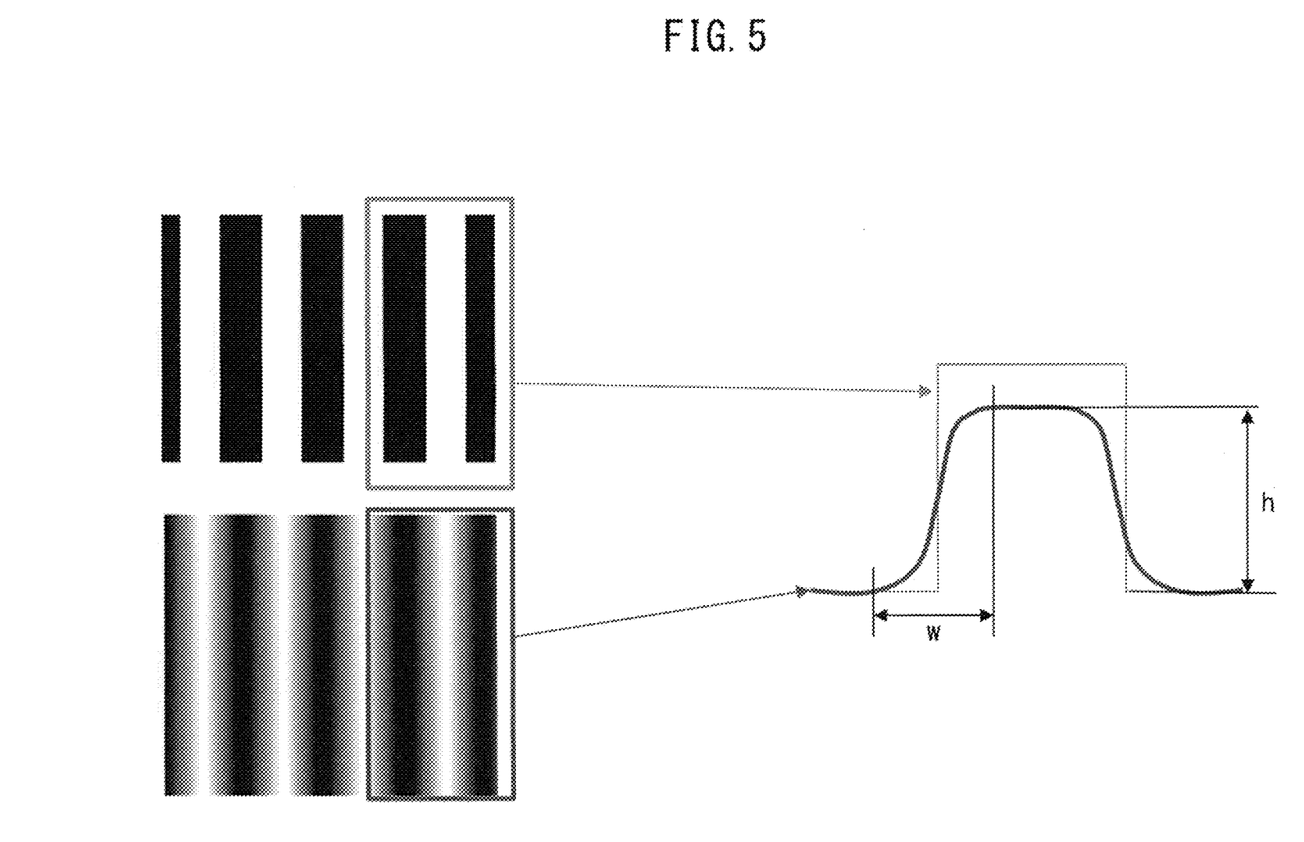
FIG. 5 is a view showing an optical phenomena influence calculation method according to an embodiment.

FIG. 5 shows a method for calculating the influence of optical phenomena according to the present embodiment. Since the influence Fi of the optical phenomena is equivalent to the degree of blur in the image, the influence coefficient $C_1$ described above is determined from, for example, the formula below. In the formula below, w is the spread width of the shaded edge, and h is the height of the shaded edge.

[Formula 3]

$$C_1 = f(w, h) \qquad 3$$

The influence coefficient $C_1$ may be set in advance by, for example, the device provider by capturing an image of a subject having a predetermined pattern prepared in advance, or may be determined from the distribution of the amounts of light received by a target pixel and peripheral pixels thereof in phase images while using the device, i.e., from a spread width w and a height h of a shaded edge. Furthermore, the correction coefficient $C_2$ can be experimentally determined in advance by the device provider in accordance with the individual characteristics within the device.

The influence Fi exerts a strong influence on pixels near the target pixel, and weakens as the distance increases. Thus, the influence coefficient $C_1$ can be well described by a smoothing filter, in particular, a Gaussian filter. In another embodiment, another smoothing filter, for example, a moving average filter, a median filter, a low-pass filter, or the like, may be applied. Further, in some cases, a dedicated filter, for example, an asymmetric filter, which is described later, may be prepared.

A conventional Gaussian filter is described by the following formula. In the following formula, x and y are positions within the filter, with (0, 0) as a center, and a is the standard deviation of the Gaussian distribution. As the value of standard deviation a increases, the Gaussian distribution becomes flatter, while the effect of smoothing (blurring) increases, and the smaller the value of standard deviation a, the more the Gaussian distribution becomes convex, and the smaller the effect of smoothing (blurring). Thus, the standard deviation a may be obtained from formula 3 above, or the device provider may set a fixed value in advance.

[Formula 4]

$$h_g(x, y) = \frac{1}{2\pi\sigma^2} \exp\left\{-\frac{x^2 + y^2}{2\sigma^2}\right\} \qquad 4$$

Figure 6:
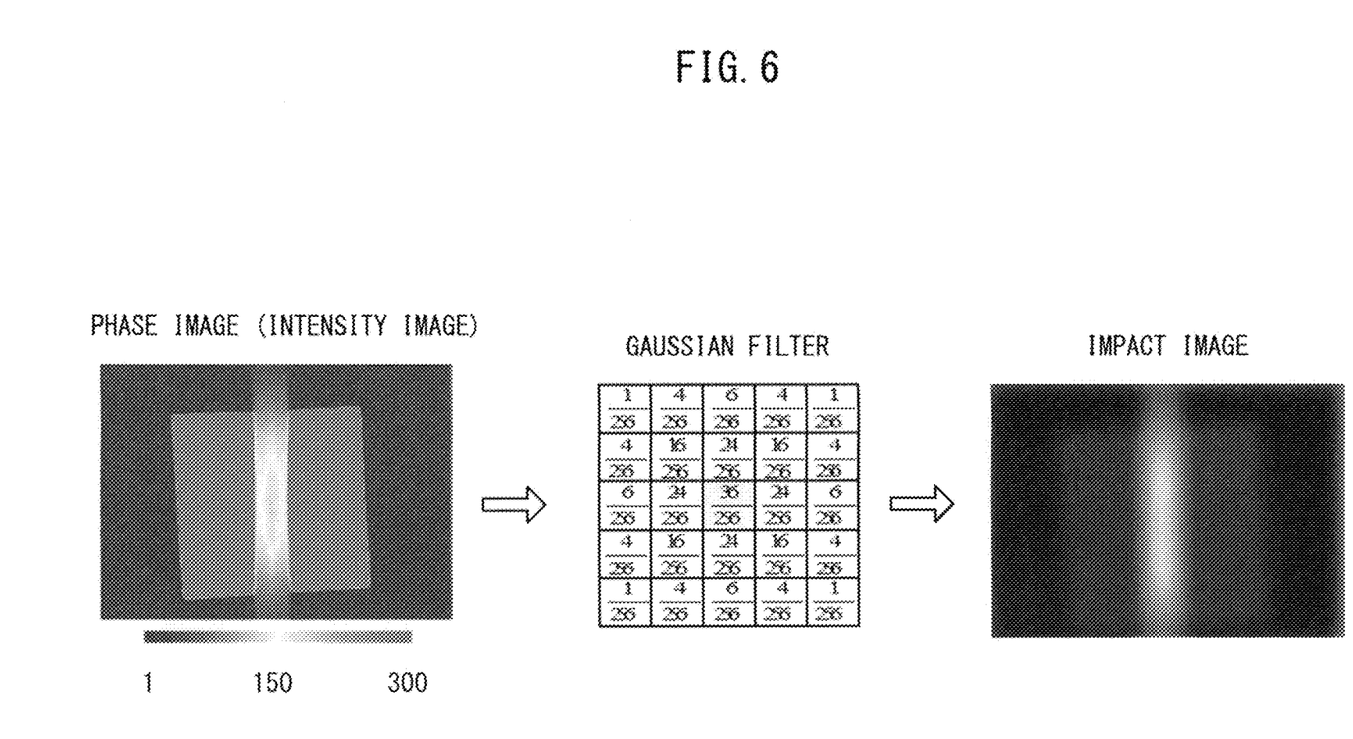
FIG. 6 is a view showing an impact image generation method according to an embodiment.

FIG. 6 shows an impact image generation method according to the present embodiment. Impact images are generated by applying, for example, a 5×5 Gaussian filter to each phase image.

Since the influence of optical phenomena such as stray light and aberrations differs depending on the distance from the image center and the position within the filter in some cases, in actual applications, an asymmetric filter in which at least one of the correction coefficient of distance (i', j') from the image center and the weight (a, b) of the position in the filter is applied to the Gaussian filter is more preferable. The asymmetric filter can be described by, for example, the following formula. In the following formula, the position of the pixel in the image is set as (i, j), the position of the image center pixel is set as $(i_c, j_c)$, and the distance (i', j') from the image center is $(i-i_c, j-j_c)$.

[Formula 5]

$$h_g(i', j', x, y) = \frac{1}{2\pi\sigma^2} \frac{1}{a(i')b(j')} \exp\left\{-\frac{a^2(i')x^2 + b^2(j')y^2}{2\sigma^2}\right\} \qquad 5$$

Figure 7A:
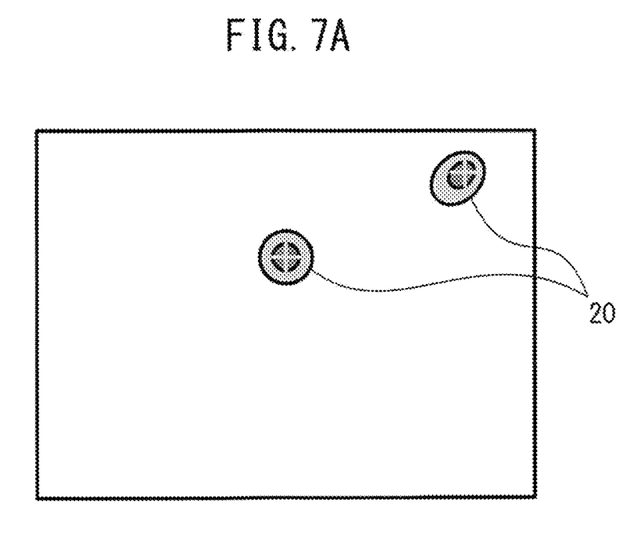
FIG. 7A is a view showing an example of an asymmetric filter.
Figure 7B:
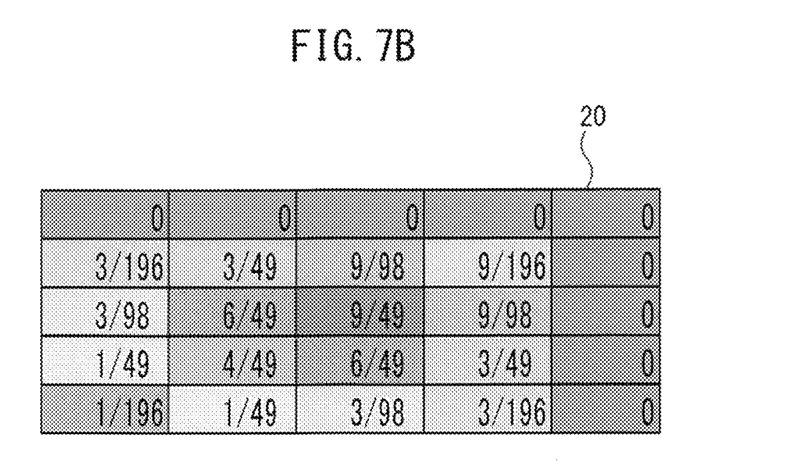
FIG. 7B is a view showing an example of an asymmetric filter.

FIGS. 7A and 7B show examples of an asymmetric filter (corresponding to the "influence coefficient") generated by the above formula. As shown in FIG. 7A, the asymmetric filter 20 has reduced asymmetry toward the image center $(i_c, j_c)$ and increases in asymmetry toward the periphery of the image. Furthermore, it is also possible to change the Gaussian distribution, that is, the filter shape, in accordance with the weight (a, b) of the position in the filter. As a result, it is possible to represent the influence of various optical phenomena such as stray light and aberrations with high accuracy. FIG. 7B shows an example of an asymmetric filter applied to the periphery of an image.

Figure 8:
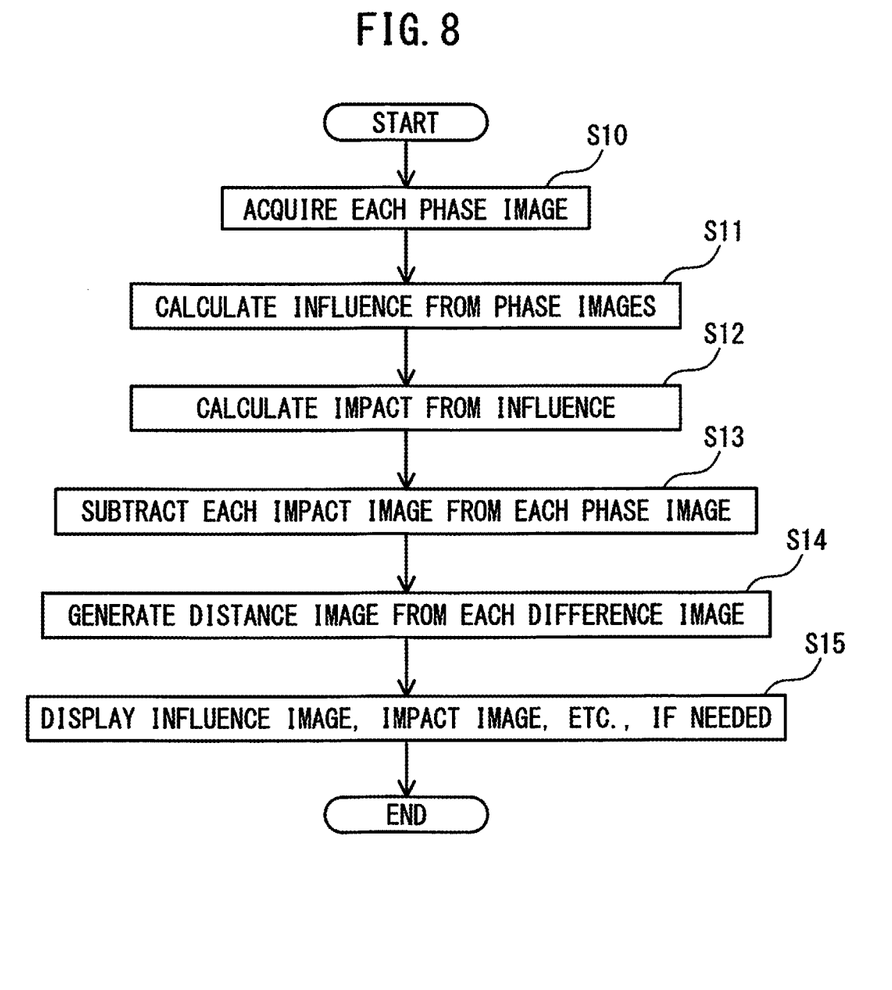
FIG. 8 is a flowchart showing the operations of the distance image generation device according to an embodiment.

FIG. 8 is a flowchart showing the operations of the distance image generation device 1 according to the present embodiment. When the distance image generation device 1 begins operations, in step S10, image capture is repeated at a plurality of image timings having phases different from the reference light to acquire each of the phase images. Each phase image may be stored in the memory.

In step S11, the influence of optical phenomena is calculated based on the amount of light received by the target pixel and peripheral pixels thereof in each phase image. In other words, in this step, a smoothing filter (corresponding to the "influence coefficient") such as a Gaussian filter is generated from the distribution of the amounts of light received by the target pixel and the peripheral pixels, and the influence is calculated based on the relationship between the influence coefficients and the amounts of light received by the target pixel and the peripheral pixels. However, the smoothing filter (influence coefficient) may be set in advance by the device provider, and a fixed value may be loaded. Furthermore, influence images may be generated based on the influences calculated at this time, and the influence images may be stored in the memory.

In step S12, the impact exerted on the target pixel by the peripheral pixel is calculated based on the calculated influence. In other words, in this step, the smoothing filter (corresponding to the "influence coefficient") is applied to each phase image, and impact images are generated. At this time, the impact image may be stored in the memory.

In step S13, the impact images are subtracted from each phase image to generate difference images. The difference images correspond to the phase images of the light which should be originally received. In step S14, a distance image is generated from each difference image based on the distance calculation formula of formula 1 above. At this time, the difference images may be stored in the memory. Note that the generated distance image may be applied to a control system which controls machines such as robots, machine tools, and automobiles, an object monitoring system that monitors objects in a monitoring region, etc.

Though not indispensable, in step S15, at least one of the phase images, the influence images, the impact images, and the difference images are displayed on the display unit. In particular, by displaying the influence images and impact images, investigation of the cause of the distance measurement abnormality is facilitated. Since the distance measurement abnormality becomes great in locations at which the impact is large, it is possible to take measures such as moving, to the location, the subject causing the distance measurement abnormality by specifying the location where the influence is presumed to be exerted.

Figure 9:
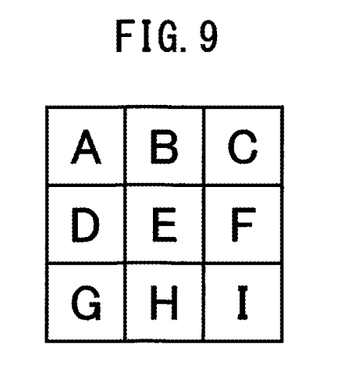
FIG. 9 is an explanatory diagram detailing a distance measurement abnormality correction method according to another embodiment.

A distance measurement abnormality correction method according to another embodiment will be described with reference to FIG. 9. Note that this embodiment differs from the embodiment described above in that phase images, impact images, difference images, etc., are not used. FIG. 9 shows a target pixel E and peripheral pixels thereof A, B, C, D, F, G, H, and I.

The influence of the distance measurement abnormality is determined in accordance with the actual distance value of the target pixel E, which receives the influence, the actual distance values of the peripheral pixels A, B, C, D, F, G, H, and I, which exert the influence, and the influence coefficients of the target pixel and the peripheral pixels. Thus, the measurement value l of the target pixel E can be described by the formula below. In the formula below, $l_a$, $l_b$, $l_c$, $l_d$, $l_e$, $l_f$, $l_g$, $l_h$, and $l_i$ are the actual distance values of the target pixel and the peripheral pixels, and a, b, c, d, e, f, g, h, and i are influence coefficients.

[Formula 6]

$$l = \frac{al_a + bl_b + cl_c + dl_d + el_e + fl_f + gl_g + hl_h + il_i}{a+b+c+d+e+f+g+h+i} \quad 6$$

By solving the formula above for the actual distance value $l_e$, the formula below is obtained. Since the actual distance values $l_a$, $l_b$, $l_c$, $l_d$, $l_f$, $l_g$, $l_h$, and $l_i$ of the peripheral pixels are unknown in the formula below, in actual applications, the measurement values of the peripheral pixels may be used in place of the actual distance values. Furthermore, the influence coefficients a, b, c, d, e, f, g, h, and i may be determined from the distribution (e.g., formula 3 above) of the amounts of light received by the target pixel and the peripheral pixels.

[Formula 7]

$$l_e = \frac{l(a+b+c+d+e+f+g+h+i) - al_a - bl_b - cl_c - dl_d - fl_f - gl_g - hl_h - il_i}{e} \quad 7$$

As shown in the formula above, the actual distance value $l_e$ (i.e., the distance image) of the target pixel E can be determined by calculating the influence coefficients a, b, c, d, e, f, g, h, and i, for calculating the influence, based on the distribution of the amounts of light received at the target pixel and the peripheral pixels, and calculating the impacts $al_a$, $bl_b$, $cl_c$, $dl_d$, $fl_f$, $gl_g$, $hl_h$, and $il_i$ based on the relationship between the influence coefficients and the measurement values of the peripheral pixels.

According to the embodiments described above, it is possible to easily specify the amount of light which should be originally received by the target pixel, and correct distance measurement abnormalities caused by various optical phenomena with high accuracy.

Furthermore, the program carried out by the distance image generation device 1 may be stored on and supplied from computer-readable non-temporary recording medium, for example, a CD-ROM or the like.

Though the various embodiments have been described in the present description, the present invention is not limited to the embodiments described above, and it should be appreciated that various modifications can be made within the scope described in the claims below.

The invention claimed is:

1. A distance image generation device, comprising:
   a light projection unit for projecting reference light onto a subject,
   a light reception unit having a plurality of two-dimensionally arrayed pixels,
   an optical system for guiding light from the subject to the light reception unit, and
   a processor configured to
      calculate, based on an amount of light received by a target pixel and a peripheral pixel thereof among the plurality of pixels, an influence of optical phenomena caused by at least one of the optical system or the light reception unit affecting the light from the subject to the target pixel and the peripheral pixel,
      calculate an impact exerted by the peripheral pixel on the target pixel based on the influence, and
      generate a distance image of the subject based on the impact.

2. The distance image generation device according to claim 1, wherein the processor is further configured to
   generate impact images based on the impact for a plurality of phase images which have phases different than the reference light captured at a plurality of image timings, and
   generate the distance image based on a difference image between the phase images and the impact images.

3. The distance image generation device according to claim 1, wherein
   the processor is further configured to generate an influence image based on the influence, and generate an impact image based on the impact, and
   the distance image generation device further comprises a display configured to display at least one of the influence image and the impact image.

4. The distance image generation device according to claim 1, wherein the processor is further configured to calculate an influence coefficient for calculating the influence based on a distribution of the amount of received light at the target pixel and the peripheral pixel.

5. The distance image generation device according to claim 4, wherein the influence coefficient is calculated so as to be asymmetrical about the target pixel based on at least one of the distance from an image center to the target pixel or the peripheral pixel and position in a region constituted by the target pixel and the peripheral pixel.

6. The distance image generation device according to claim 1, wherein the processor is further configured to
calculate an influence coefficient for calculating the influence based on a distribution of the amount of received light at the target pixel and the peripheral pixel, and
calculate the impact based on the relationship between the influence coefficient and a measurement value of the peripheral pixel.

* * * * *